US010976723B2

(12) United States Patent
Wang

(10) Patent No.: US 10,976,723 B2
(45) Date of Patent: Apr. 13, 2021

(54) MOTION CONTROL SYSTEM

(71) Applicant: GUANGDONG POLYTECHNIC OF INDUSTRY AND COMMERCE, Guangdong (CN)

(72) Inventor: Qinghua Wang, Guangdong (CN)

(73) Assignee: GUANGDONG POLYTECHNIC OF INDUSTRY AND COMMERCE, Guangzhou (CN)

( * ) Notice: Subject to any disclaimer, the term of this patent is extended or adjusted under 35 U.S.C. 154(b) by 0 days.

(21) Appl. No.: 16/699,707

(22) Filed: Dec. 1, 2019

(65) Prior Publication Data

US 2020/0103856 A1 Apr. 2, 2020

Related U.S. Application Data

(63) Continuation of application No. PCT/CN2018/111108, filed on Oct. 19, 2018.

(30) Foreign Application Priority Data

Sep. 10, 2018 (CN) .......................... 201811055799.9

(51) Int. Cl.
G05B 19/414 (2006.01)
G05B 19/042 (2006.01)

(52) U.S. Cl.
CPC ..... G05B 19/4141 (2013.01); G05B 19/0423 (2013.01); *G05B 2219/34013* (2013.01)

(58) Field of Classification Search
CPC ...... G05B 19/4141; G05B 2219/33218; G05B 2219/33219; G05B 19/4103; H02P 1/00; H02P 1/04; H02P 1/46; H02P 1/12; H02P 1/22; H02P 1/465; H02P 3/00; H02P 3/18; H02P 3/22; H02P 21/00; H02P 6/00;

(Continued)

(56) References Cited

U.S. PATENT DOCUMENTS

| 4,481,569 A * | 11/1984 | Hoodbhoy | ............. G05B 19/23 318/574 |
| 6,757,583 B2 * | 6/2004 | Giamona | ........... G05B 19/4141 318/572 |
| 2012/0056572 A1 * | 3/2012 | Bigler | .................... H02K 11/30 318/570 |

FOREIGN PATENT DOCUMENTS

| CN | 201869158 U | 6/2011 |
| CN | 102739146 A | 10/2012 |

(Continued)

*Primary Examiner* — Antony M Paul

(57) ABSTRACT

A motion control system comprises a power module, a plurality of servo motors, a servo control module, a motion control module and a microprocessor; the power module controls the working power supply output by the alternating-current power supply; the plurality of servo motors converts current signal of the output current flowing to an encoder output signal; the servo control module converts the encoder output signal into a first logic control signal; the microprocessor converts the first logic control signal into a third control signal and controls the servo control module to adjust the power module, which changes the working power supply output by the alternating-current power supply so as to drive servo motors. The invention provides a motion control system which integrates motion controller and supports multi-axis alternating-current servo driver to realize automatic control of the servo driver and improve control precision of the servo driver.

9 Claims, 4 Drawing Sheets

(58) Field of Classification Search
CPC .... H02P 6/10; H02P 6/188; H02P 6/32; H02P 23/00; H02P 27/00; H02P 27/04; H02P 7/00; H02P 27/08; H02P 25/22; H02P 27/06; H02M 7/5387; B62D 5/046
USPC ..... 318/400.01, 400.02, 700, 721, 799, 800, 318/801, 560, 561, 568.11, 568.12, 318/568.21, 568.15
See application file for complete search history.

(56) References Cited

FOREIGN PATENT DOCUMENTS

| | | | | |
|---|---|---|---|---|
| CN | 104009679 A | * | 8/2014 | ................ H02P 5/74 |
| CN | 104009679 A | | 8/2014 | |
| CN | 105892366 A | | 8/2016 | |

* cited by examiner

MOTION CONTROL SYSTEM

CROSS-REFERENCE TO RELATED APPLICATIONS

The present application is a Continuation Application of PCT application No. PCT/CN2018/111108 filed on Oct. 19, 2018, which claims priority of Chinese Patent Application No. 201811055799.9 filed on Sep. 10, 2018, the contents of which are hereby incorporated by reference.

FIELD OF THE INVENTION

The present invention relates to automatic control technology and, more particularly to a motion control system.

BACKGROUND OF THE INVENTION

At present, motion control of numerical control equipment and industrial robot on the market generally implements multi-axis linear or joint motion through a plurality of alternating-current servo drivers and the same number of servo motors. In addition, automatic control is realized by a multi-axis motion controller. According to the control method, the brands of the motion controller and the alternating-current servo drivers are different so that the performance parameter settings of the motion controller located on the upper computer and the alternating-current servo driver on the lower computer are inconsistent, which leads to large difference in the motion precision of the equipment, and brings inexplicable trouble to the user.

SUMMARY OF THE INVENTION

The technical problem to be solved by the embodiment of the invention is as follows. The invention provides a motion control system which integrates motion controller and supports multi-axis alternating-current servo driver. The system realizes automatic control of the servo driver, and improves control precision of the servo driver.

In order to solve the problem, the embodiment of the invention provides a motion control system which comprises a power module, a plurality of servo motors, a servo control module, a motion control module and a microprocessor.

The power module is connected with the plurality of servo motors to control a working power supply output by the alternating-current power supply.

The plurality of servo motors are connected with the servo control module to receive an output current flowing through the power module, condition and shape a current signal of the output current, convert the current signal into an encoder output signal and send the output signal to the servo control module.

The servo control module is connected with the power control module to receive encoder output signals respectively sent by the plurality of servo motors, and convert encoder output signals into a first logic control signal after counting and discerning direction processing.

The motion control module is connected with the servo control module and the microprocessor to send the first logic control signal to the microprocessor.

The microprocessor receives the first logic control signal, performs an interpolation on the first logic control signal to convert the first logic control signal into a third control signal and feeds back the third control signal to the motion control module, so that the motion control module controls the servo control module to adjust the power module, the working power supply output by the alternating-current power supply is thus changed by the power module to drive the plurality of servo motors.

Further, the power module comprises a power supply control unit, a plurality of alternating-direct-alternating power units, a plurality of spatial vector pulse width modulation integration units and a current detection unit.

The power supply control unit controls an output of the alternating-current power supply.

Input ends of the plurality of alternating-direct-alternating power units are connected with an output end of the power supply control unit, output ends of the plurality of alternating-direct-alternating power units are connected with the plurality of servo motors.

The plurality of alternating-direct-alternating power units carrying out variable-frequency and variable-voltage conversion on the working power supply output by the alternating-current power supply.

Each of the spatial vector pulse width modulation integration units is connected with each output end of the alternating-direct-alternating power units with a one-to-one correspondence to modulate a working voltage of the plurality of alternating-direct-alternating power units.

The current detection unit is connected with each output end of each the alternating-direct-alternating power units to detect a working current of each alternating-direct-alternating power unit.

Further, the servo control module comprises a logic control unit, a control processing unit and a position feedback unit.

The logic control unit is connected with the motion control module to convert the encoder output signals respectively sent by the plurality of servo motors into the first logic control signal which is sent to the microprocessor through the motion control module, and send a corresponding second logic control signal to the control processing unit according to the third control signal fed back by the microprocessor.

The control processing unit is connected with the logic control unit, the power supply control unit and the plurality of space vector pulse width modulation integration units to receive the second logic control signal and output a plurality of sets of modulation signals to the corresponding space vector pulse width modulation integration units so as to control the plurality of alternating-direct-alternating power units.

The position feedback unit is connected with the logic control unit; the position feedback unit comprises a plurality of position feedback interfaces.

The plurality of position feedback interfaces are respectively connected with the plurality of servo motors with a one-to-one correspondence to send the encoder output signals to the logic control unit.

Further, the system comprises as follows:

a servo display module connected with the control processing unit.

Further, the motion control module comprises an instruction and feedback unit and a field programmable gate array (FPGA) unit.

The instruction and feedback unit is connected with the FPGA unit and the servo control module to send the first logic signal to the FPGA unit.

The FPGA unit is connected with the microprocessor to send the first logic signal to the microprocessor so that the microprocessor generates the third control signal; the FPGA unit performs a fine interpolation on the third control signal, and then feeds back the third control signal to the servo driving module through the instruction and feedback unit.

Further, the power module comprises: a fault detection unit.

The fault detection unit is connected with the logic control unit.

Further, the servo motor comprises an encoder for outputting the encoder output signal.

The encoder is an incremental encoder or an absolute encoder.

Further, comprises a controller display module connected with the microprocessor.

The controller display module comprises a display unit and a data storage flash unit.

Further, the microprocessor is an advanced reduced instruction set computing machine (ARM) processor.

The embodiment of the invention has the following beneficial effects:

The motion control system comprises a power module, a plurality of servo motors, a servo control module, a motion control module and a microprocessor. The power module is connected with the servo motor. The servo control module is connected with the servo control module and is used for receiving an encoder output signal of the servo motor. The motion control module is connected with the servo control module and used for sending an encoder output signal to the microprocessor. The microprocessor receives the encoder output signal, is used for feeding back a corresponding third control signal, and controls the servo control module to drive a plurality of servo motors through the motion control module. Compared with the prior art, the controller and the servo driver are combined in the invention with result that higher data transmission and feedback speed and higher practicability are achieved.

DETAILED DESCRIPTION OF ILLUSTRATED EMBODIMENTS

The technical solutions in the embodiments of the present invention are clearly and completely described in the following with reference to the drawings. It is obvious that the described embodiments are only a part of the embodiments of the present invention rather than all embodiments. All other embodiments obtained by persons of ordinary skill in the art based on the embodiments of the present invention without creative efforts shall fall within the protection scope of the present invention.

Figure 1:
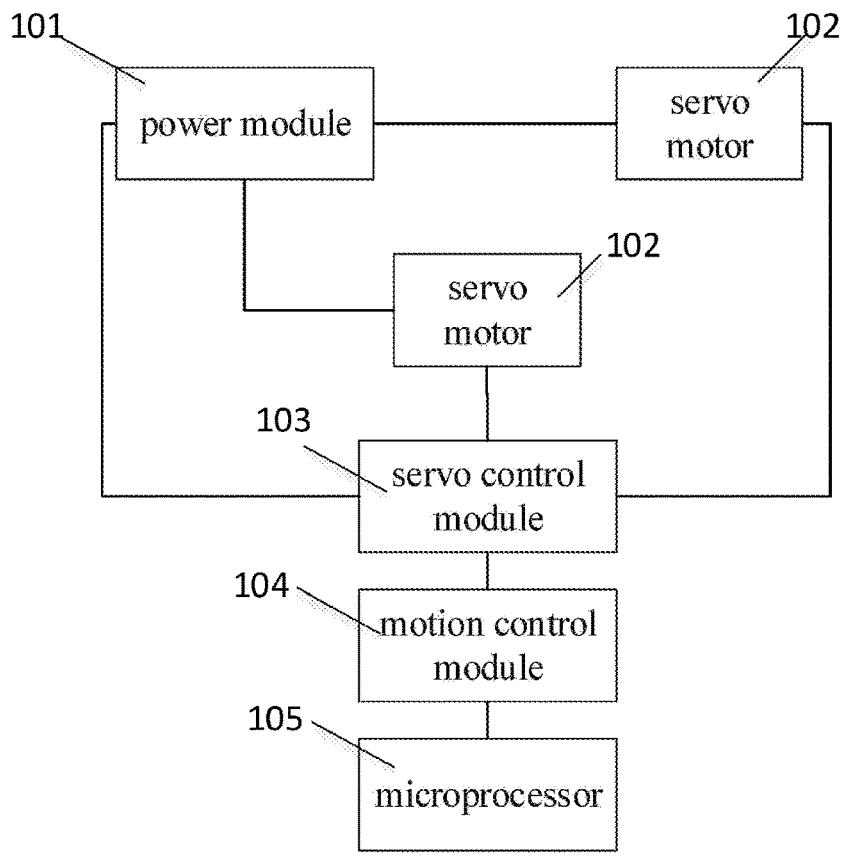
FIG. 1 is a basic structure chart of the motion control system according to an embodiment of the present invention.
Figure 2:
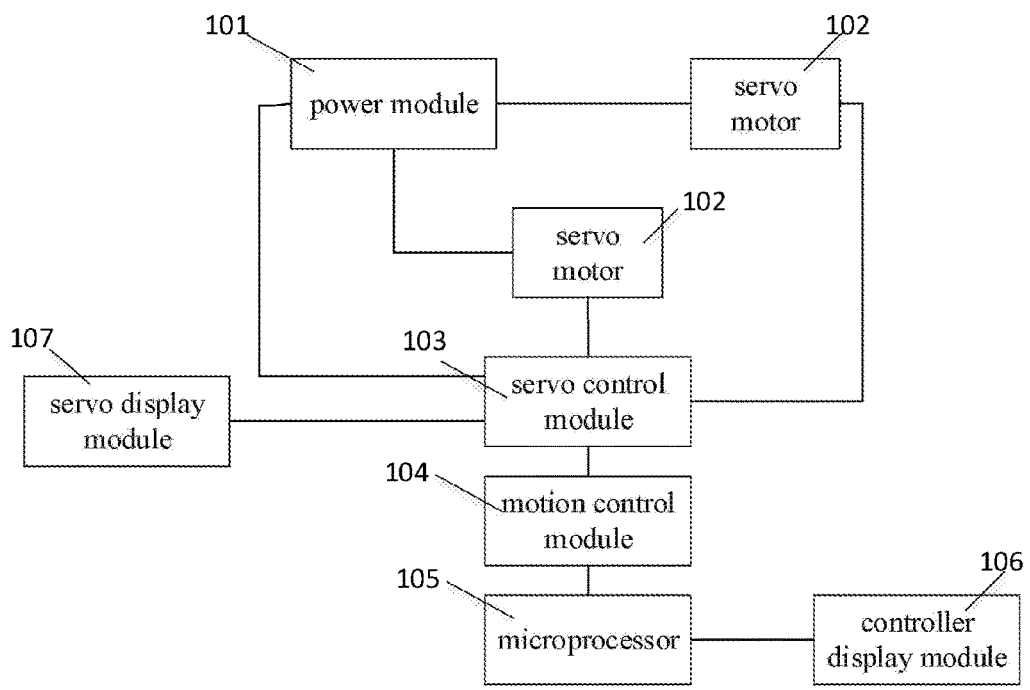
FIG. 2 is a basic structure chart of the motion control system according to another embodiment of the present invention.
Figure 3:
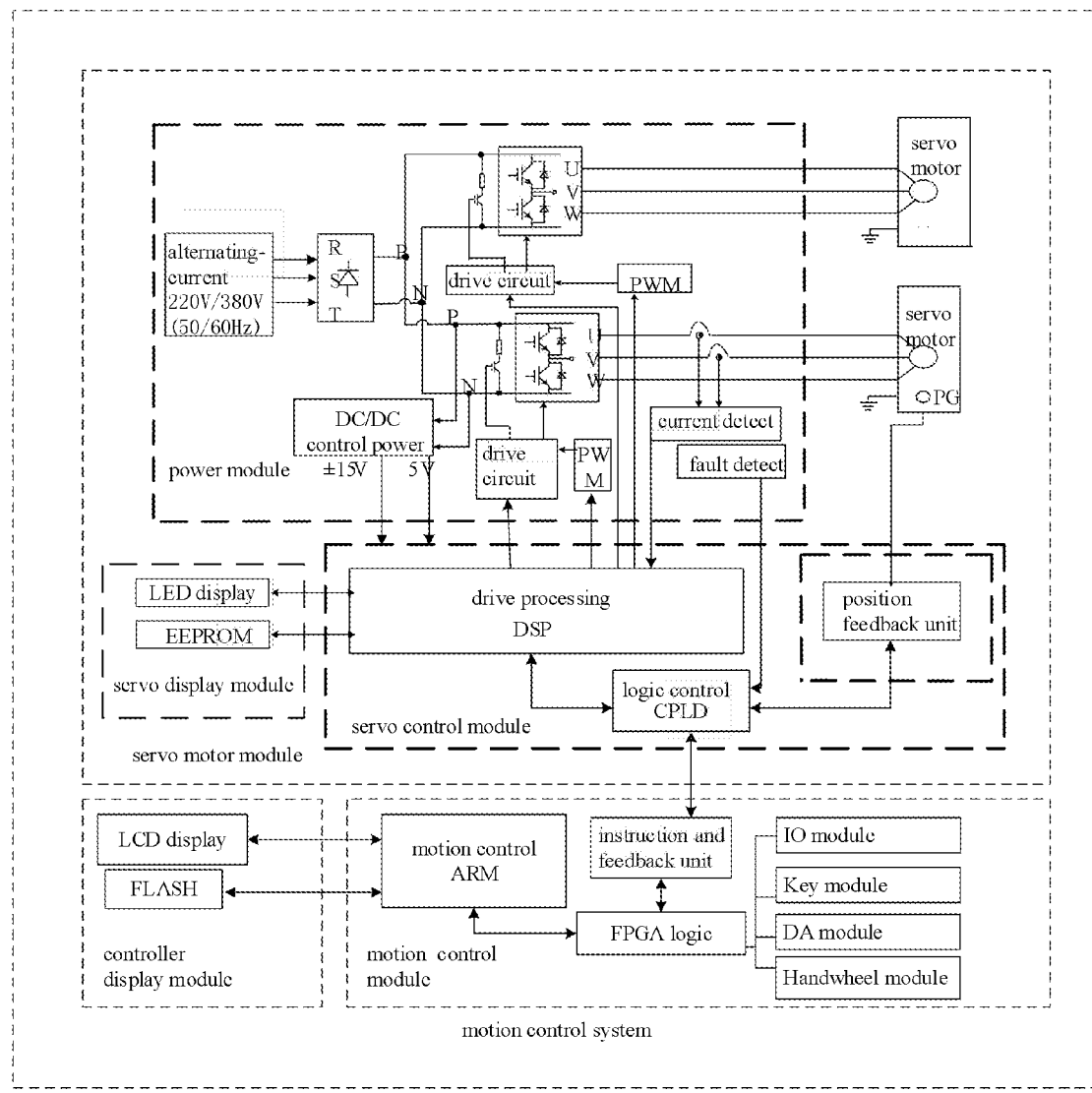
FIG. 3 is a basic structure chart of the motion control system according to another embodiment of the present invention.

Please refer to FIGS. 1 to 3.

FIG. 1 a basic structure chart of the motion control system according to an embodiment of the present invention. As shown in FIG. 1, the system is externally connected with an alternating-current power supply, and comprises a power module 101, a plurality of servo motors 102, a servo control module 103, a motion control module 104 and a microprocessor 105.

The power module 101 is connected to a plurality of servo motors 102, and the plurality of servo motors 102 are connected to a servo control module 103, the servo control module 103 is connected with the power module 101. The motion control module 104 is connected with the servo control module 103 and the microprocessor 105.

The power module 101 is used for controlling power supply output by the alternating-current power supply. The power module 101 is a device comprising a power supply, a drive circuit, a frequency transformer, and a controller. The plurality of servo motors 102 are used for receiving the output current flowing through the power module 101 and carrying out conditioning shaping, and converting the current signal into an encoder output signal and sending the encoder output signal to the servo control module 103. The servo control module 103 is used for receiving encoder output signals sent by a plurality of servo motors 102, and after counting and discerning direction processing, the encoder output signal is converted into a first logic control signal. The motion control module 104 is configured to send the first logic control signal to the microprocessor 105. The servo control module 103 is a device comprising a plurality of controllers. The microprocessor 105 is used for receiving the first logic control signal and performing interpolation on the logic control signal, and converts the first logic control signal into a third control signal. The third control signal is fed back to the motion control module 104, so the motion control module 104 can control the servo control module 103 to adjust the power module 101, and enable the power module 101 to change the working power supply output by the alternating-current power supply so as to drive the plurality of servo motors 102. The motion control module 104 is a device comprising ARM, FPGA, and a plurality of controllers. The encoder output signal includes a position signal representative of the servo motor 102. The counting and discerning direction processing is realized through Verilog HDL language.

In the embodiment, an alternating-current motion control system for simultaneously driving two servo motors and supporting two position feedback is adopted, wherein the number of servo motors 102 is two, the microprocessor 105 adopts an ARM processor. The microprocessor comprises the following functions: display, parameter management, PLC management, code management, simulation management, tool management and communication management, and completing coding, cutter compensation, speed control and interpolation.

FIG. 2 is a basic structure chart of the motion control system according to another embodiment of the present invention. Except the structure shown in FIG. 1, the system further comprises a controller display module 106 and a servo display module 107.

The controller display module 106 is connected to the microprocessor 105 and is used for displaying relevant control parameters of the microprocessor 105. The controller display module 106 further comprises a display unit 601 and a data storage flash unit 602. The controller display module 106 is a device comprising a display screen and a memorizer.

The servo display module 107 is connected with the servo control module 103. The servo display module 107 is a device comprising a display screen and a memorizer.

In the embodiment, the display unit 601 uses an LED display screen to display related control parameters of the microprocessor 105. The servo display module 107 adopts the method of connecting light-emitting diode display screen with electrically erasable programmable read-only memory and is used for displaying the servo control parameters.

Figure 4:
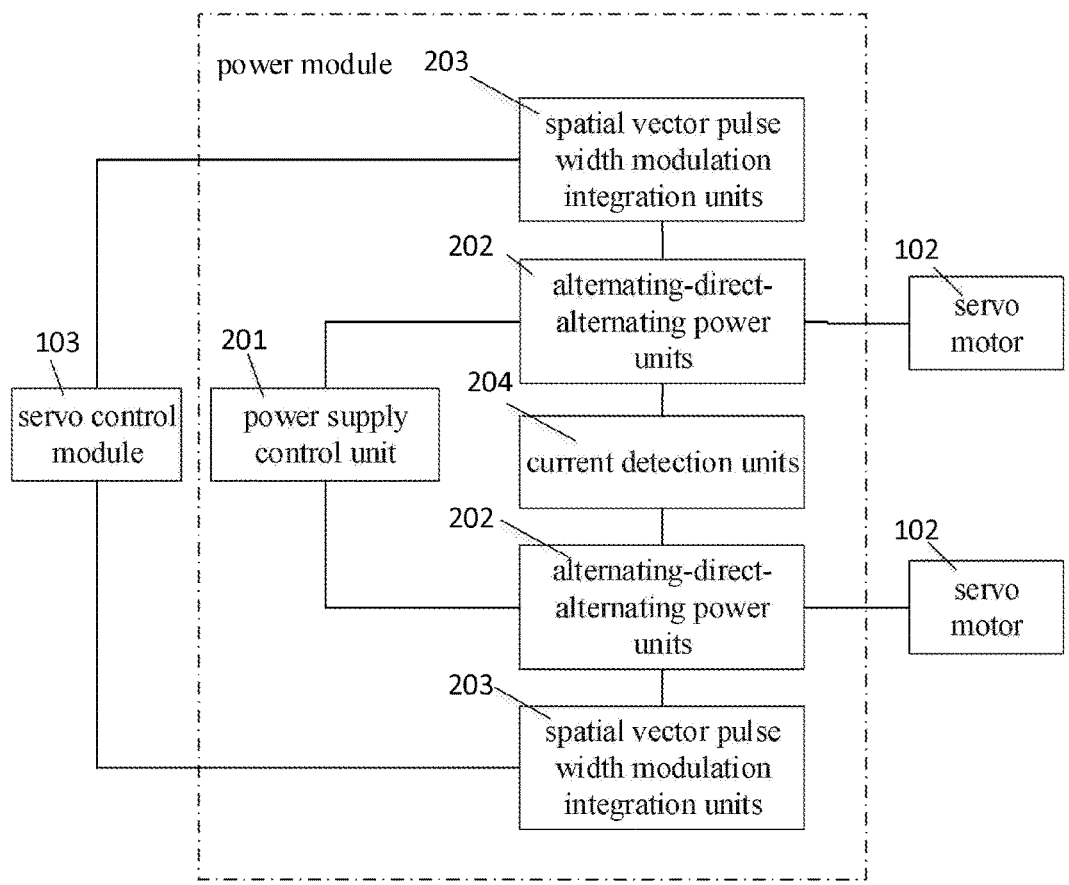
FIG. 4 is a basic structure chart of the power module according to an embodiment of the present invention.

Please refer to FIG. 4.

FIG. 4 is a basic structure chart of the power module according to an embodiment of the present invention. The power module comprises: a power supply control unit 201, a plurality of alternating-direct-alternating power units 202, a plurality of spatial vector pulse width modulation integration units 203 and a current detection unit 204.

The output end of the power supply control unit 201 is connected with the input end of the plurality of alternating-direct-alternating power units 202. The output ends of the plurality of alternating-current-alternating power units 202 are connected with two servo motors 102. A plurality of spatial vector pulse width modulation integration units 203 are respectively connected with the output ends of the alternating-direct-alternating power units 202 in a one-to-one correspondence mode. The current detection unit 204 is connected to the output end of each alternating-direct-alternating power unit 202.

In the embodiment, the power supply control unit 201, connecting a power source with a DC/DC conversion sub-unit, is used to control the output of an alternating-current power supply. The spatial vector pulse width modulation integrated unit 203 comprises a Pulse width modulation (PWM) pulse modulation sub-unit and an interface circuit sub-unit. The PWM pulse modulation sub-unit is used for receiving a second logic control signal generated by the servo control module 103 and modulating the second logic control signal to generate two groups of PWM voltage signals, and the two groups of PWM voltage signals are sent to the two alternating-direct-alternating power units 202 through the interface circuit sub-unit, so that the output current of the two alternating-direct-alternating power units 202 is adjusted, and the two servo motors are controlled to work. Two current detection units 204 are connected to the output ends of the two alternating-direct-alternating power units 202, the output current of the two alternating-direct-alternating power units 202 is detected in real time, ensuring the normal work of the two servo motors. Wherein the power supply control unit 201, the spatial vector pulse width modulation integrated unit 203 or the servo control module 103 is a controller, each of the two alternating-direct-alternating power units 202 is a power device.

Figure 5:
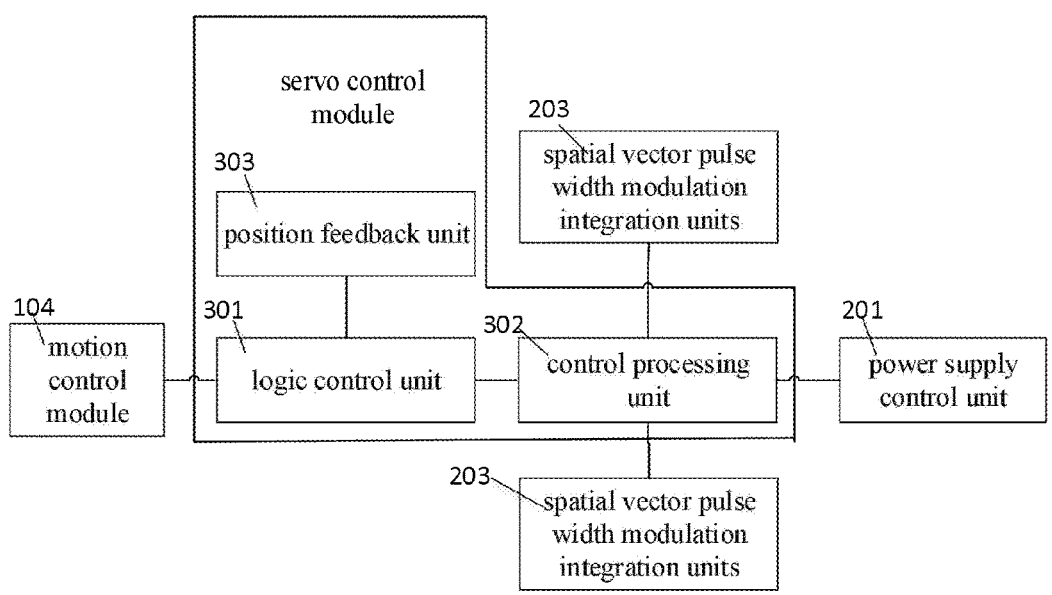
FIG. 5 is a basic structure chart of the servo control module according to an embodiment of the present invention.

Please refer to FIG. 5.

FIG. 5 a basic structure chart of the servo control module according to an embodiment of the present invention. It comprises a logic control unit 301, a control processing unit 302 and a position feedback unit 303.

The logic control unit 301 is connected with the motion control module 104, and the control processing unit 302 is connected with the logic control unit 301, a power supply control unit 201 and a plurality of spatial vector pulse width modulation integration units 203. The position feedback unit 303 is connected to the logic control unit 301. Wherein the logic control unit 301, the control processing unit 302 or the position feedback unit 303 is a controller.

In the embodiment, the hardware interface of the position feedback unit 303 is provided with a first position feedback interface and a second position feedback interface, and the two position feedback interfaces are respectively connected with position feedback elements such as encoders or grating rulers of the two servo motors. The interface forms of the two position feedback interfaces are the same, and the two position feedback interfaces are all suitable for an encoder or a grating ruler.

In the embodiment, the logic control unit 301 adopts a Complex Programmable Logic Device (CPLD). The encoders of the two servo motors comprise incremental encoders or absolute encoders. By setting parameters of the CPLD, the two position feedback interfaces can choose to adopt an incremental encoder or an absolute type encoder. When the position feedback unit 303 is externally connected with an incremental encoder, a high-frequency interference signal in the differential signal is filtered out through the incremental encoder, then the position feedback unit 303 carries out conditioning shaping on the current signals, converting the current signals into encoder output signals, inputting the signals into a CPLD, and performing counting and discerning direction processing. When the position feedback interface is externally connected with an absolute encoder, a current signal is input to the CPLD through the absolute encoder, and performed counting and discerning direction processing, and then a first logic signal is generated and sent to the motion control module 104.

In the embodiment, the CPLD is also used for receiving a third control signal which is subjected to fine interpolation by the motion control module 104, generating a second logic signal and sending the second logic signal to the control processing unit 302.

In this embodiment, the control processing unit 302 adopts a Digital Signal Processor (DSP). The DSP completes keyboard scanning, display and parameter management, and the control of the current loop/speed ring/position loop, and outputs two sets of PWM signals to the corresponding spatial vector pulse width modulation integration unit 203 according to the received second logic signals.

Figure 6:
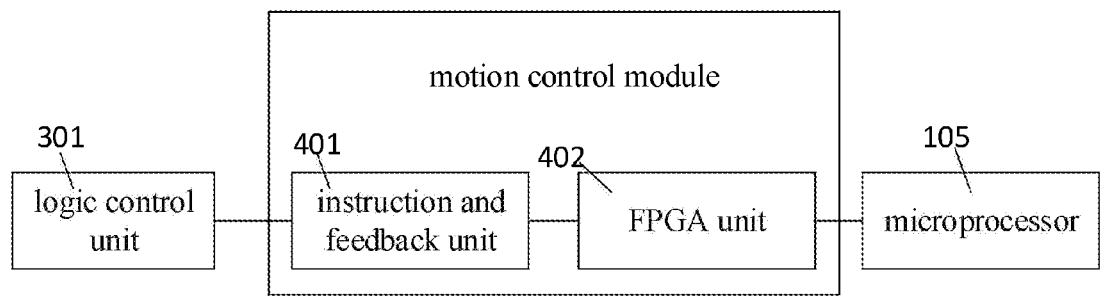
FIG. 6 is a basic structure chart of the motion control module according to an embodiment of the present invention.

Please refer to FIG. 6.

FIG. 6. a basic structure chart of the motion control module according to an embodiment of the present invention. It comprises the instruction and feedback unit 401 and the field programmable gate array (FPGA) unit 402. Wherein the instruction and feedback unit 401 is a controller.

The instruction and feedback unit 401 is connected to the FPGA unit 402. The FPGA unit 402 is connected to the microprocessor 105.

In the embodiment, the instruction and feedback unit 401 is used for receiving the first logic signal generated by the CPLD, and sending the first logic signal to the FPGA unit 402 and is used for sending a third control signal subjected to the precise interpolation of the FPGA back to the CPLD. The FPGA unit 402 is used for sending the first logic signal received by the instruction and feedback unit 401 to the microprocessor 105. The FPGA unit 402 is also used for completing keyboard scanning and IO control.

From above, the embodiment of the invention provides a motion control system, which comprises a power module, a plurality of servo motors, a servo control module, a motion control module and a microprocessor. The power module is used for controlling working power supply output by alternating-current power supply. The plurality of servo motors are used for receiving the output current of the power module and converting the current signals of the output circuit into encoder output signals and sending the encoder output signals to the servo control module. The servo control module is used for converting an encoder output signal into a first logic control signal and transmitting the first logic control signal to the microprocessor through the motion control module. The microprocessor generates a third control signal according to the first logic signal, and sends the third control signal to the servo control module after the third control signal is adjusted by the motion control module. The servo control module adjusts the power module so that the power module can change the working power output by the alternating-current power supply so as to drive the plurality of servo motors to work. Compared with the prior art, the invention provides a motion control system, which integrates motion controller and supports multi-axis alternating-current servo driver, so that automatic control of the servo driver is realized, and the control precision of the servo driver is improved.

The above description is a preferred embodiment of the present invention, and it should be noted that persons of ordinary skill in the art will appreciate that a plurality of improvements and modifications can be made without departing from the principle of the present invention, and these improvements and modifications are also considered to be within the protection scope of the present invention.

What is claimed is:

1. A motion control system, externally connected with an alternating-current power supply, wherein the motion control system comprises a power module, a plurality of servo motors, a servo control module, a motion control module and a microprocessor;
    the power module is connected with the plurality of servo motors to control a working power supply output by the alternating-current power supply;
    the plurality of servo motors are connected with the servo control module to receive an output current flowing through the power module, condition and shape a current signal of the output current, convert the current signal into an encoder output signal and send the output signal to the servo control module;
    the servo control module is connected with the power control module to receive encoder output signals respectively sent by the plurality of servo motors, and convert the encoder output signals into a first logic control signal after counting and discerning direction processing;
    the motion control module is connected with the servo control module and the microprocessor to send the first logic control signal to the microprocessor;
    the microprocessor receives the first logic control signal, performs an interpolation on the first logic control signal to convert the first logic control signal into a third control signal and feeds back the third control signal to the motion control module, so that the motion control module controls the servo control module to adjust the power module, the working power supply output by the alternating-current power supply is thus changed by the power module to drive the plurality of servo motors.

2. The motion control system of claim 1, wherein the power module comprises a power supply control unit, a plurality of alternating-direct-alternating power units, a plurality of spatial vector pulse width modulation integration units and a current detection unit;
    the power supply control unit controls an output of the alternating-current power supply;
    input ends of the plurality of alternating-direct-alternating power units are connected with an output end of the power supply control unit, output ends of the plurality of alternating-direct-alternating power units are connected with the plurality of servo motors;
    the plurality of alternating-direct-alternating power units carrying out variable-frequency and variable-voltage conversion on the working power supply output by the alternating-current power supply;
    each of the spatial vector pulse width modulation integration units is connected with each output end of the alternating-direct-alternating power units with a one-to-one correspondence to modulate a working voltage of the plurality of alternating-direct-alternating power units;
    the current detection unit is connected with each output end of each the alternating-direct-alternating power units to detect a working current of each alternating-direct-alternating power unit.

3. The motion control system of claim 2, wherein the servo control module comprises a logic control unit, a control processing unit and a position feedback unit;
    the logic control unit is connected with the motion control module to convert the encoder output signals respectively sent by the plurality of servo motors into the first logic control signal which is sent to the microprocessor through the motion control module, and send a corresponding second logic control signal to the control processing unit according to the third control signal fed back by the microprocessor;
    the control processing unit is connected with the logic control unit, the power supply control unit and the plurality of space vector pulse width modulation integration units to receive the second logic control signal and output a plurality of sets of modulation signals to the corresponding space vector pulse width modulation integration units so as to control the plurality of alternating-direct-alternating power units;
    the position feedback unit is connected with the logic control unit; the position feedback unit comprises a plurality of position feedback interfaces;
    the plurality of position feedback interfaces are respectively connected with the plurality of servo motors with a one-to-one correspondence to send the encoder output signals to the logic control unit.

4. The motion control system of claim 3, further comprising a servo display module connected with the control processing unit.

5. The motion control system of claim 3, wherein the power module further comprises a fault detection unit which is connected with the logic control unit.

6. The motion control system of claim 1, further comprising an instruction and feedback unit and a field programmable gate array (FPGA) unit;
    the instruction and feedback unit is connected with the field programmable gate array (FPGA) unit and the servo control module to send the first logic signal to the field programmable gate array (FPGA) unit;
    the field programmable gate array (FPGA) unit is connected with the microprocessor to send the first logic signal to the microprocessor so that the microprocessor generates the third control signal; the field programmable gate array (FPGA) unit performs a fine interpolation on the third control signal, and then feeds back the third control signal to the servo driving module through the instruction and feedback unit.

7. The motion control system of claim 1, wherein the servo motor further comprises an encoder for outputting the encoder output signal;

the encoder is an incremental encoder or an absolute encoder.

8. The motion control system of claim 1, further comprising a controller display module connected with the microprocessor;

the controller display module comprises a display unit and a data storage flash unit.

9. The motion control system of claim 1, wherein the microprocessor is an advanced reduced instruction set computing machine (ARM) processor.

* * * * *